US012403721B1

(12) United States Patent
Jones

(10) Patent No.: US 12,403,721 B1
(45) Date of Patent: Sep. 2, 2025

(54) CHALK LINE MARKING DEVICES AND METHODS

(71) Applicant: Dustin Jones, Benton, LA (US)

(72) Inventor: Dustin Jones, Benton, LA (US)

( * ) Notice: Subject to any disclaimer, the term of this patent is extended or adjusted under 35 U.S.C. 154(b) by 0 days.

(21) Appl. No.: 19/017,932

(22) Filed: Jan. 13, 2025

(51) Int. Cl.
*B44D 3/38* (2006.01)

(52) U.S. Cl.
CPC .................................... *B44D 3/38* (2013.01)

(58) Field of Classification Search
CPC ........................................................ B44D 3/38
See application file for complete search history.

(56) References Cited

U.S. PATENT DOCUMENTS 4,152,836 A 5/1979 Rodrique
4,660,291 A * 4/1987 Dehn ...................... B44D 3/38 33/414
4,679,325 A 7/1987 Sweatman
4,819,337 A 4/1989 Noyes
5,038,492 A * 8/1991 Bryant ................ E04G 21/1891 156/577
6,826,845 B2 12/2004 Pritchard
7,231,722 B2 * 6/2007 Hickey .................... B44D 3/38 33/1 LE
7,469,482 B2 12/2008 Hickey et al.
7,555,843 B2 * 7/2009 Leonard ............... G01B 3/1041 33/759
8,414,218 B1 * 4/2013 Gelardi ...................... B62J 6/00 222/614
11,623,840 B1 * 4/2023 Goecke .................. B65H 37/02 156/71
12,157,653 B2 * 12/2024 Goecke ............... B29C 65/5092
2002/0170191 A1 11/2002 Kolodzieski
2002/0194744 A1 12/2002 Shor
2007/0068021 A1 * 3/2007 Fisher ...................... B44D 3/38 33/414
2009/0049703 A1 * 2/2009 Leonard ................. B44D 3/225 33/759

FOREIGN PATENT DOCUMENTS

AU 1880499 A * 3/1999 ........... A63C 19/065
DE 10307183 A1 * 9/2004 ........... E01C 23/163

* cited by examiner

*Primary Examiner* — Yaritza Guadalupe-Mccall
(74) *Attorney, Agent, or Firm* — R. Keith Harrison

(57) ABSTRACT

Chalk line marking devices suitable for placing chalk lines at selected chalk line spacings on a surface may include a device housing having a housing interior. The housing interior may be sized and configured to contain a supply of a powdered chalk material. A chalk marking assembly slot may be in the device housing. A chalk marking assembly may be selectively extendable from the housing interior through the chalk marking assembly slot. The chalk marking assembly may include an elongated, flexible main marking member. An elongated, flexible guide member may be disposed in parallel, spaced-apart relationship to the main marking member. Multiple center marking members may span the main marking member and the guide member. The center marking members may be disposed at mark spacings with respect to each other. The mark spacings may correspond in length to the respective chalk line spacings.

20 Claims, 16 Drawing Sheets

CHALK LINE MARKING DEVICES AND METHODS

FIELD

Illustrative embodiments of the disclosure generally relate to devices and methods suitable for marking chalk lines on a surface in construction and other applications. More particularly, illustrative embodiments of the disclosure relate to chalk line marking devices which are suitable for placing chalk lines at selected chalk line spacings on a bottom plate to mark the positions of wall studs on the bottom plate in construction of a wall.

SUMMARY

Illustrative embodiments of the disclosure are generally directed to chalk line marking devices suitable for placing chalk lines at selected chalk line spacings on a surface. An illustrative embodiment of the chalk line marking devices may include a device housing. A housing interior may be in the device housing. The housing interior may be sized and configured to contain a supply of a powdered chalk material. A chalk marking assembly slot may be in the device housing. A chalk marking assembly may be selectively extendable from the housing interior through the chalk marking assembly slot. The chalk marking assembly may include an elongated, flexible main marking member. An elongated, flexible guide member may be disposed in parallel, spaced-apart relationship to the main marking member. Multiple center marking members may span the main marking member and the guide member. The center marking members may be disposed at mark spacings with respect to each other. The mark spacings may correspond in length to the respective chalk line spacings.

In another aspect, a reel assembly may be disposed in the housing interior of the device housing and a reel crank may engage the reel assembly for rotation. The chalk marking assembly may be wound on the reel assembly.

In another aspect, each of the main marking member and the guide member of the chalk marking assembly may be a segment of string, thread, twine, cord or a combination thereof.

In another aspect, the mark spacings may include inch mark spacings.

In another aspect, the mark spacings may include 24 inch mark spacings.

In another aspect, at least one chalk opening may be in the device housing. At least one chalk opening door may be selectively deployable in open and closed door positions with respect to the chalk opening.

In another aspect, at least one slot seal may be in the chalk marking assembly slot. The slot seal may sealingly engage the chalk marking assembly.

In another aspect, at least one engaging member may be on the main marking member and the guide member of the chalk marking assembly.

In another aspect, the center marking members may include multiple center marking member pairs.

In some embodiments, the chalk line marking devices may include a chalk wheel handle. A chalk wheel may be supported by and journaled for rotation with respect to the chalk wheel handle. The chalk wheel may include a wheel housing including a circumferential outer wheel housing portion. Multiple chalk dispensing cavities may be in the outer wheel housing portion. Each chalk dispensing cavity may be sized and configured to contain a supply of a powdered chalk material and dispense the powdered chalk material from the wheel housing at the outer wheel housing portion responsive to rolling of the chalk wheel on the surface. The chalk dispensing cavities may be disposed at mark spacings with respect to each other along the outer wheel housing portion. The mark spacings may correspond in length to the respective chalk line spacings.

In another aspect, multiple chalk dispensing inserts may be deployed in the respective chalk dispensing cavities. The chalk dispensing inserts may be sized and configured to contain the powdered chalk material and dispense the powdered chalk material from the wheel housing at the outer wheel housing portion.

In another aspect, the chalk dispensing inserts may be releasably disposed in the respective chalk dispensing cavities.

In another aspect, a wheel housing interior may be in the wheel housing. The wheel housing interior may be sized and configured to contain the powdered chalk material and dispense the powdered chalk material to the respective chalk dispensing cavities.

In another aspect, at least one chalk opening may be in the wheel housing and communicate with the wheel housing interior. At least one chalk opening door may be selectively deployable in open and closed door positions with respect to the chalk opening.

In another aspect, the mark spacings may include 16 inch mark spacings.

In another aspect, the mark spacings may include 24 inch mark spacings.

In another aspect, the chalk dispensing cavities may include multiple respective chalk dispensing cavity pairs.

In some embodiments, the chalk line marking devices may include a chalk wheel handle. A chalk wheel may be supported by and journaled for rotation with respect to the chalk wheel handle. The chalk wheel may include a wheel housing including a pair of spaced-apart side wheel housing portions, a circumferential outer wheel housing portion on the side wheel housing portions and a wheel housing interior formed by the side wheel housing portions and the outer wheel housing portion. Multiple chalk dispensing cavities may be in the outer wheel housing portion. The chalk dispensing cavities may be disposed at mark spacings with respect to each other. The mark spacings may correspond in length to the respective chalk line spacings. Multiple inner cavity slots may establish communication between the wheel housing interior and the respective chalk dispensing cavities. Multiple outer cavity slots may communicate with the respective chalk dispensing cavities and open to the outer wheel housing portion. Multiple chalk dispensing inserts may be in the respective chalk dispensing cavities and communicate with the respective inner cavity slots and outer cavity slots. The chalk dispensing inserts may be sized and configured to contain a supply of powdered chalk and dispense the powdered chalk from the wheel housing through the respective outer cavity slots at the outer wheel housing portion.

BRIEF DESCRIPTION OF THE DRAWINGS

Illustrative embodiments of the disclosure will now be described, by way of example, with reference to the accompanying drawings, in which.

Like reference numerals refer to like parts throughout the several views of the drawings.

DETAILED DESCRIPTION

Figure 2:
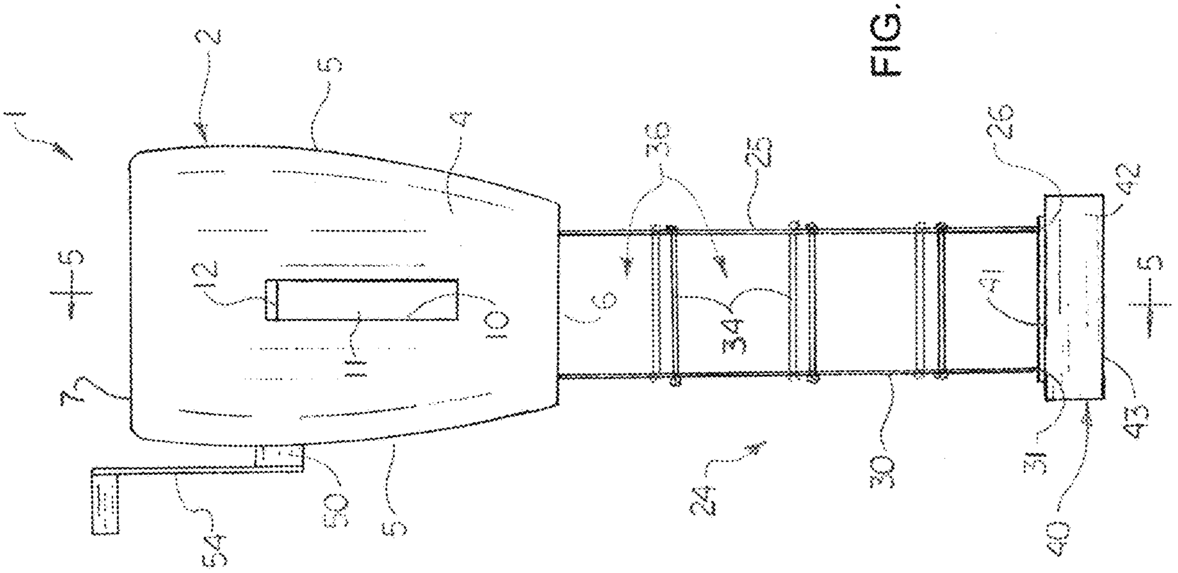
FIG. 2 is a top view of the illustrative chalk line marking device of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

The term "or combinations thereof as used herein refers to all permutations and combinations of the listed items preceding the term. For example, "A, B, C, or combinations thereof is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figure 7:
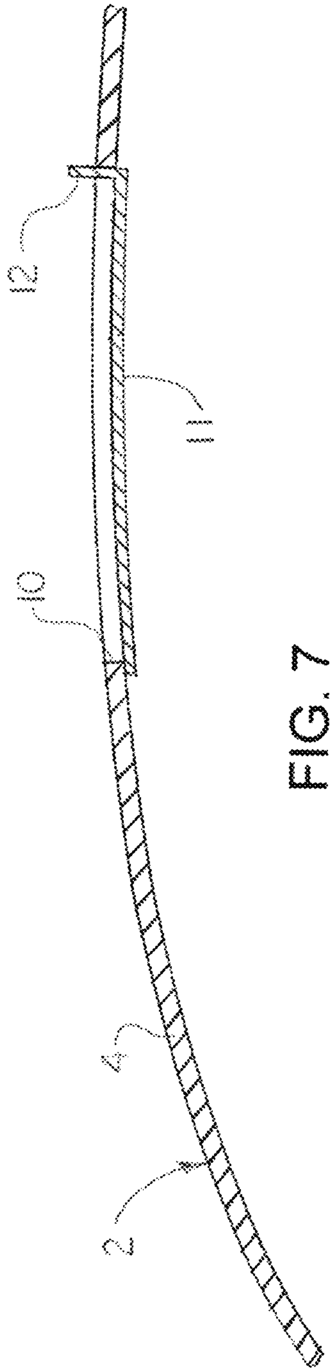
FIG. 7 is an enlarged sectional view of a top housing portion of the device housing with a chalk opening in the top housing portion and a typical chalk opening door deployed in a closed door position to close the chalk opening.
Figure 8:
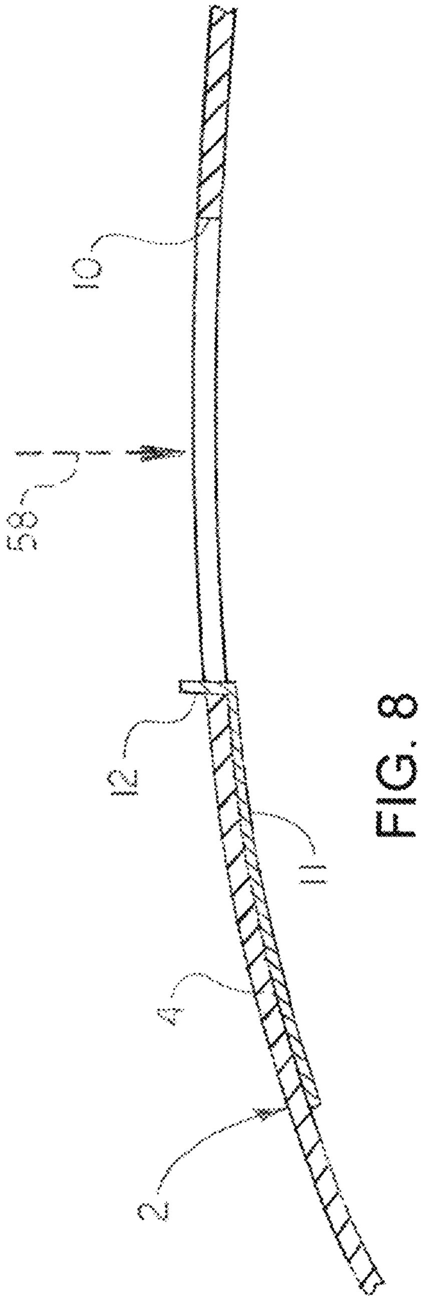
FIG. 8 is an enlarged sectional view of the top housing portion of the device housing with the chalk opening door deployed in an open door position for placement of powdered chalk (illustrated in phantom) into the device housing through the chalk opening.
Figure 9:
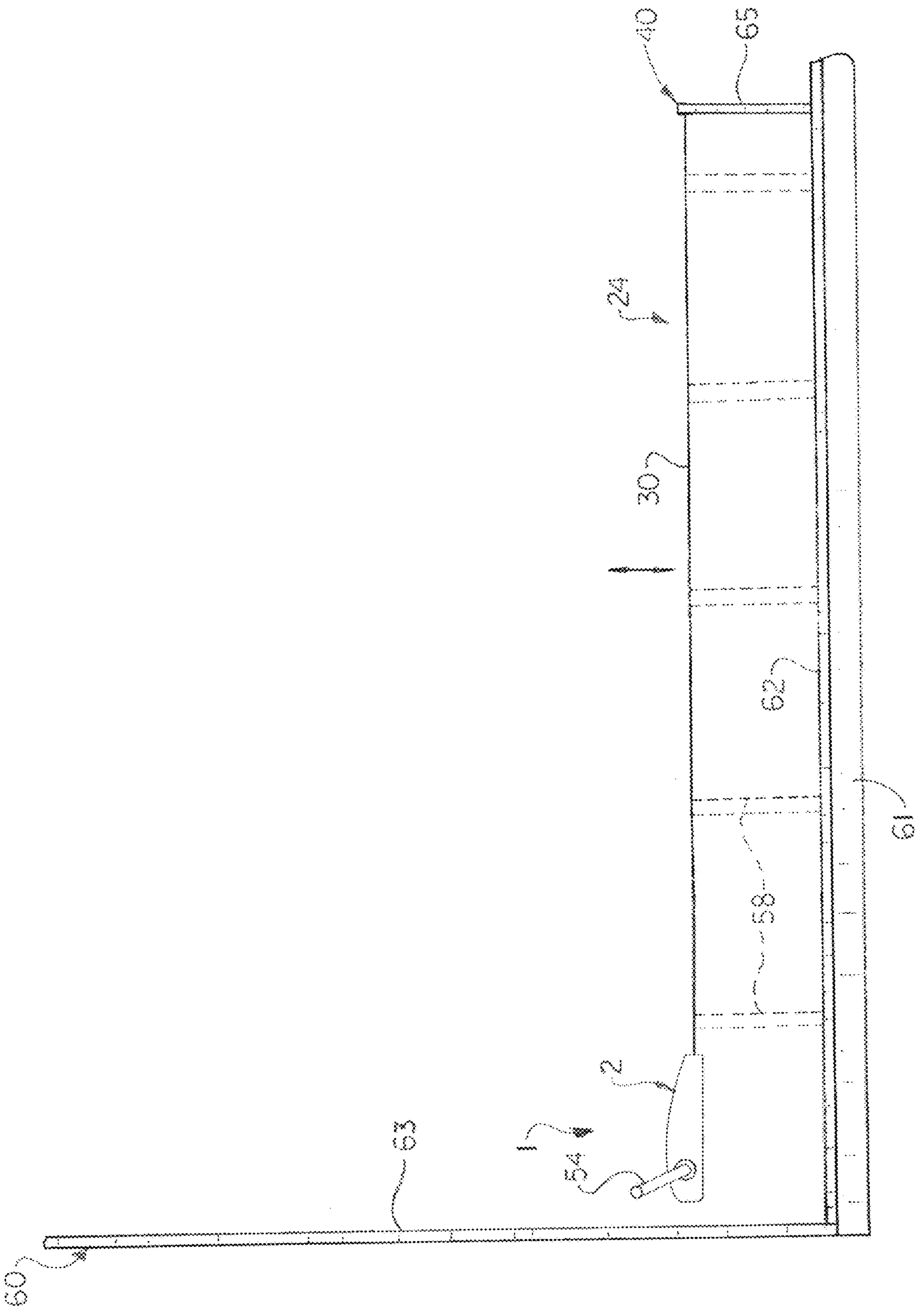
FIG. 9 is a side view, partially in section, of a wall section of a building having a foundation and a bottom plate on the foundation, more particularly illustrating typical placement of chalk lines on the bottom plate at selected chalk line spacings with respect to each other in typical application of the chalk line marking devices.
Figure 10:
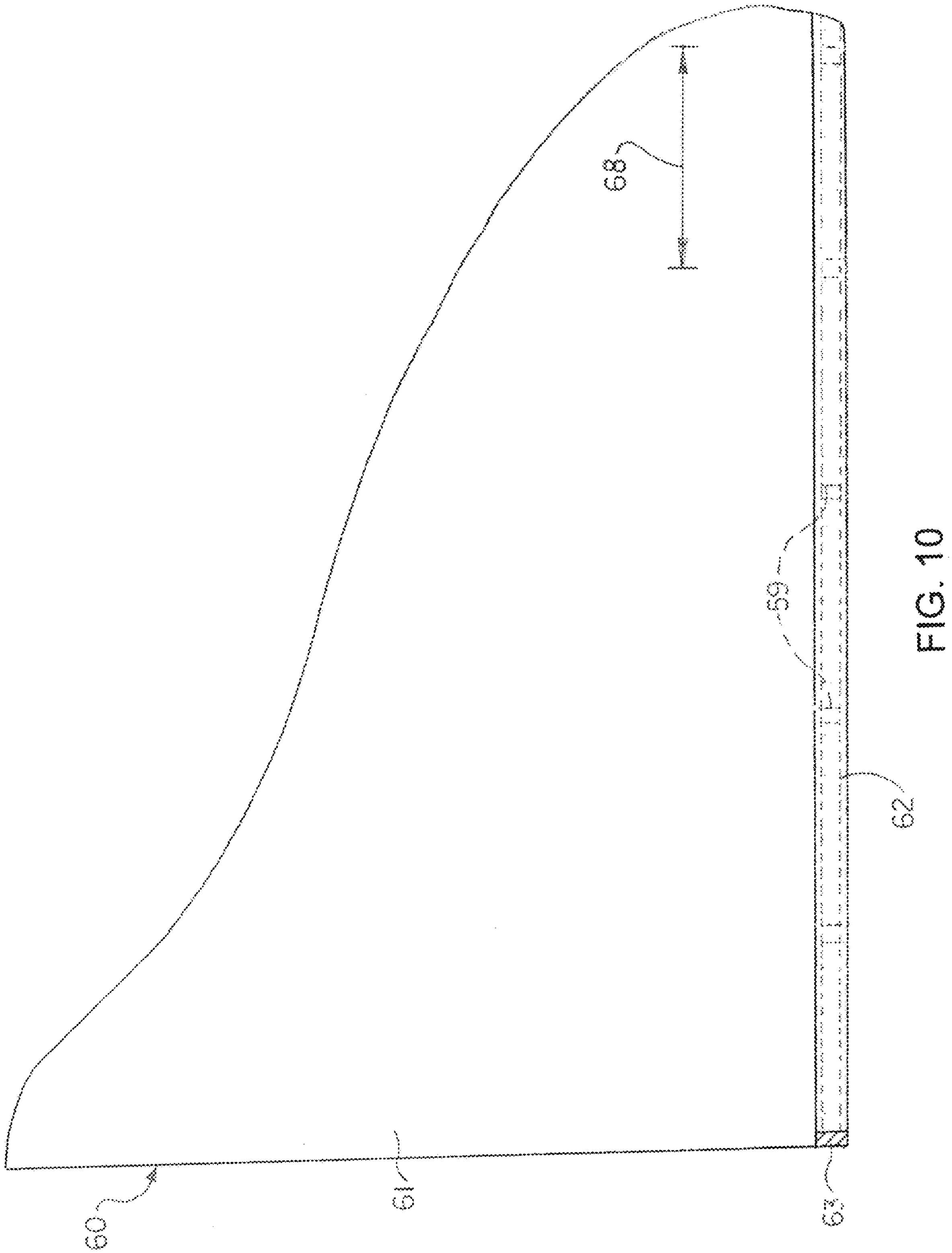
FIG. 10 is a top view, partially in section, of the foundation and the wall section on the foundation of the building illustrated in FIG. 9, with the chalk lines formed on the bottom plate at the selected chalk line spacings.
Figure 11:
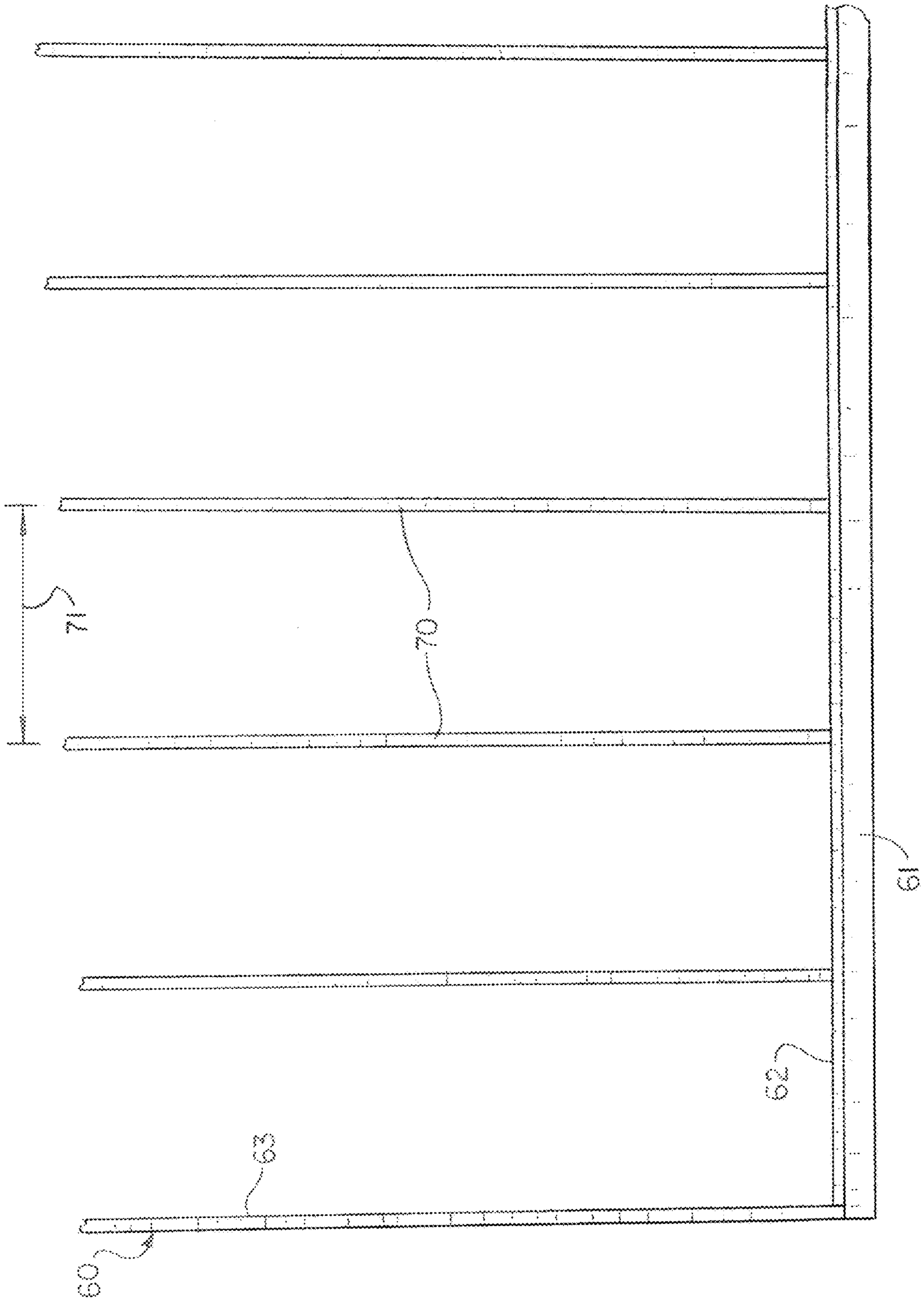
FIG. 11 is a side view, partially in section, of the wall section of the building, with multiple wall studs extending upwardly from the bottom plate at the respective chalk lines and at wall stud spacings which correspond to the chalk line spacings of the chalk lines illustrated in FIG. 10.

Referring initially to FIGS. 1-11 of the drawings, an illustrative embodiment of the chalk line marking devices, hereinafter device, of the disclosure is generally indicated by reference number 1. As illustrated in FIGS. 9-11 and will be hereinafter described, in typical application, the device 1 may be suitable for dispensing a powdered chalk material 58 to place chalk lines 59 at selected chalk line spacings 68 on a surface 62. For example and without limitation, in some applications, the surface 62 may be a bottom plate which is on a foundation 61 of a building 60. The chalk line spacings 68 may serve as a guide to proper positioning or placement of wall studs 70 along the bottom plate 62 at wall stud spacings 71 which correspond in length to the chalk line spacings 68 in the framing or construction of an interior or exterior wall in the building 60. It will be recognized and understood, however, that the device 1 may have numerous other applications in the construction and other industries.

Figure 1:
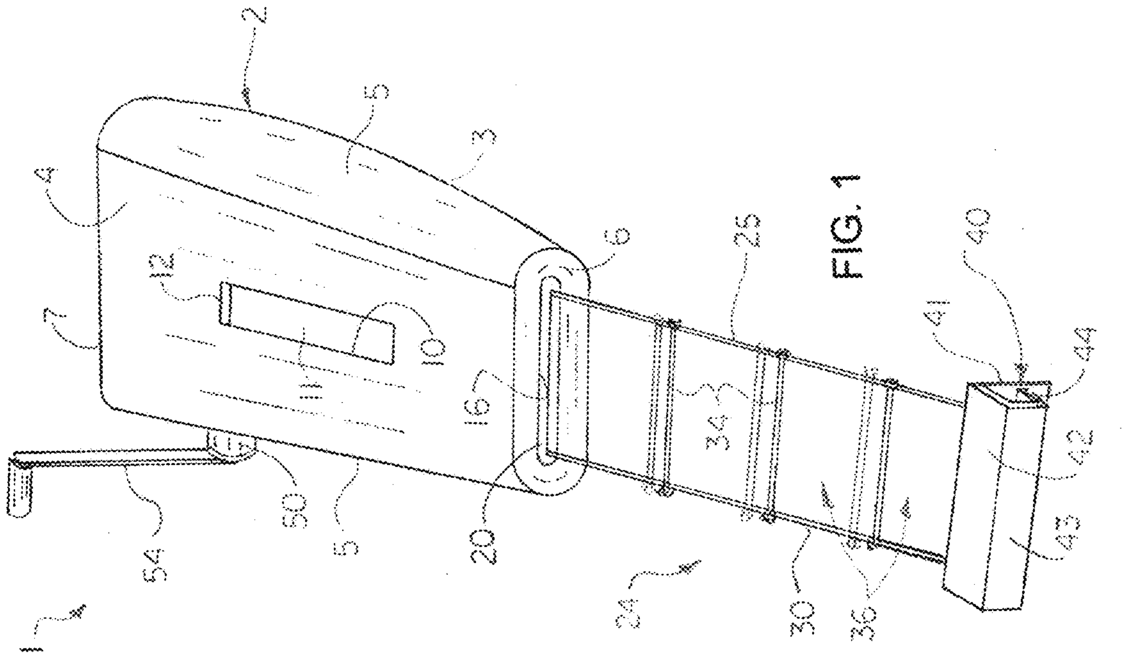
FIG. 1 is a front perspective view of an illustrative embodiment of the chalk line marking devices with a chalk marking assembly deployed in a partially extended position from a device housing of the device.
Figure 3:
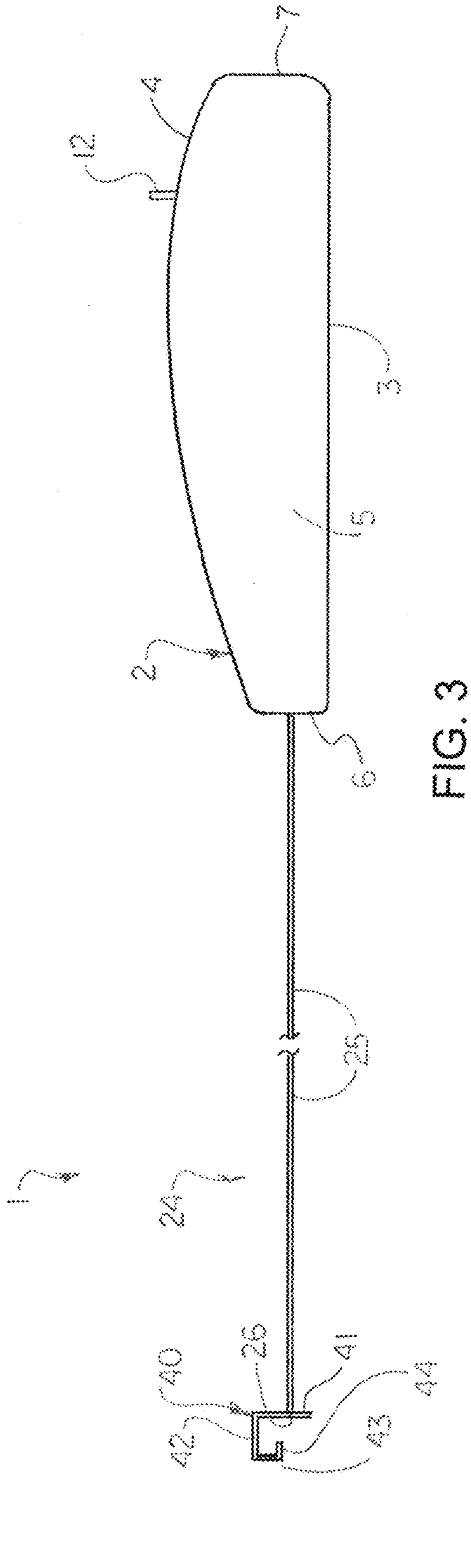
FIG. 3 is a left side view, partially in section, of the illustrative chalk line marking device with the chalk marking assembly in the extended position.
Figure 4:
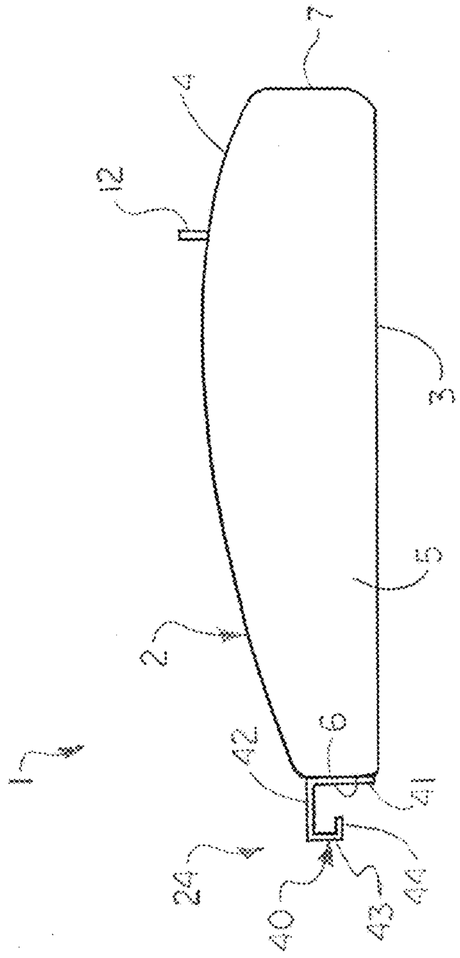
FIG. 4 is a left side view of the illustrative chalk line marking device with the chalk marking assembly in the retracted position in the device housing.
Figure 5:
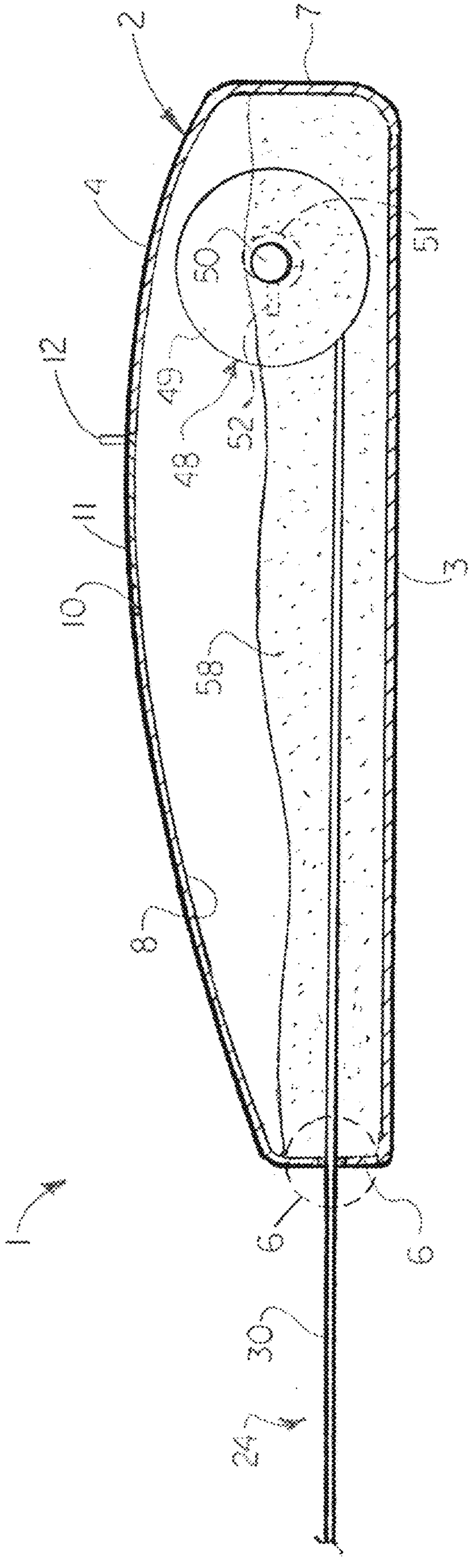
FIG. 5 is a longitudinal sectional view, taken along section lines 5-5 in FIG. 2, of a typical device housing of the illustrative chalk line marking device.

As illustrated in FIGS. 1-5, the device 1 may include a device housing 2. As illustrated in FIG. 5, the device housing 2 may have a housing interior 8. The housing interior 8 may be sized and configured to contain a supply of the powdered chalk material 58. As used herein throughout, "powdered chalk material", "chalk" and like terms include but are not limited to any type of powdered or particulate material which can be dispensed onto a surface to mark a location on the surface and may have any color and particle size depending on the desired application. A chalk marking assembly slot 16 may be provided in the device housing 2. A chalk marking assembly 24 may be selectively extendable from the housing interior 8 through the chalk marking assembly slot 16. As illustrated in FIGS. 1 and 2, the chalk marking assembly 24 may include an elongated, flexible main marking member 25. An elongated, flexible guide member 30 may be disposed in parallel, spaced-apart relationship to the main marking member 25. Multiple, spaced-apart, parallel center marking members 34 may span the main marking member 25 and the guide member 30 in perpendicular relationship to each. The center marking members 34 may be disposed at mark spacings 36 with respect to each other. The mark spacings 36 may correspond in length to the chalk line spacings 68 (FIG. 10), respectively, between the chalk lines 59 which will be made on the bottom plate 62 or other surface using the device 1. In some embodiments, the width spacing between the main marking member 25 and the guide member 30 of the chalk marking assembly 24 may be about 2¼".

Each of the main marking member 25, the guide member 30 and the center marking members 30 of the chalk marking assembly 24 may include at least one segment of string, thread, twine, cord, or a combination thereof. As further illustrated in FIGS. 1 and 2, in some embodiments, the center marking members 34 of the chalk marking assembly 24 may include multiple pairs of spaced-apart, parallel, adjacent center marking members 34. The distance between the center marking members 34 of each center marking member 34 pair may correspond to the thickness of each wall stud 70 (FIG. 11) which will be erected on the bottom plate 62 in construction of the wall of the building 60, typically as will be hereinafter further described.

In various embodiments, the mark spacings 36 between the adjacent center marking members 34 or between the adjacent pairs of the center marking members 34 of the chalk marking assembly 24 may have any of various lengths or spacings typically depending on the application of the device 1. For example and without limitation, in some embodiments, the mark spacings 36 may include 16-inch mark spacings. In other embodiments, the mark spacings 36 may include 24-inch mark spacings. In construction of the wall of the building 60 (FIG. 11), the 16-inch mark spacings 36 may facilitate placement of the wall studs 70 at 16-inch center wall stud spacings 71, whereas the 24-inch mark spacings 36 may facilitate placement of the wall studs 70 at 24-inch center wall stud spacings 71.

Figure 6:
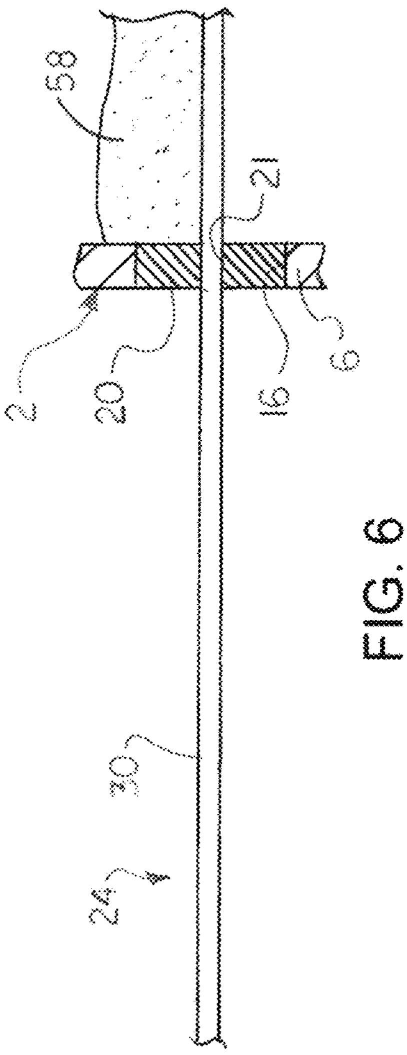
FIG. 6 is an enlarged sectional view, taken at section line 6 in FIG. 5, illustrating a typical slot seal disposed in a chalk marking assembly slot in the device housing and the chalk marking assembly sealingly engaged by the slot seal as the chalk marking assembly extends through the chalk marking assembly slot from the device housing.

As illustrated in FIGS. 1-4, in some embodiments, the device housing 2 of the device 1 may include a bottom housing portion 3; a top housing portion 4; a pair of spaced-apart side housing portions 5; a front housing portion 6; and a rear housing portion 7. As illustrated in FIG. 6, the chalk marking assembly slot 16 may extend through the front housing portion 6. At least one slot seal 20 having a seal opening 21 may be disposed in the chalk marking assembly slot 16. The slot seal 20 may be disposed in the chalk marking assembly slot 16. The slot seal 20 may include a flexible, resilient, plastic or rubber grommet, O-ring or the like which retains the powdered chalk material 58 in the housing interior 8 of the device housing 2. The slot seal 20 may sealingly engage the main marking member 25, the guide member 30 and the center marking members 34 as the chalk marking assembly 24 traverses through the seal opening 21 in extended and retracted positions of the chalk marking assembly 24 with respect to the device housing 2.

At least one chalk opening 10 may extend through the top housing portion 4 and/or any other portion of the device housing 2. A chalk opening door 11 may be selectively deployable in a closed door position (FIG. 7) to close the chalk opening 10 or in an open door position (FIG. 8) to open the chalk opening 10, typically according to the knowledge of those skilled in the art. For example and without limitation, in some embodiments, the chalk opening door 11 may slidably engage the top housing portion 4. A door tab 12 may protrude from the chalk opening door 11 for manual or digital manipulation of the chalk opening door 11 between the closed and open door positions.

As further illustrated in FIGS. 1-4, in some embodiments, at least one engaging member 40 may terminate the distal marking member end 26 of the main marking member 25 and the distal guide member end 31 of the guide member 30 of the chalk marking assembly 24, exterior to the device housing 2. The engaging member 40 may facilitate engagement of the chalk marking assembly 24 with an anchor structure 65 (FIG. 9) to maintain the chalk marking assembly 24 in the extended position with respect to the device housing 2 in typical application of the device 1, which will be hereinafter described. In some embodiments, the engaging member 40 may have a hook-shaped structure typically with a main member portion 41, a proximal member portion 42 extending perpendicularly from the main member portion 41, a distal member portion 43 extending perpendicularly from the proximal member portion 42 and a hook portion 44 extending perpendicularly from the distal member portion 43 toward the main member portion 41. In other embodiments, the engaging member 40 may have alternative designs and configurations suitable for the purpose. In some embodiments, the engaging member 40 may include two hooks with ¾ offset.

As illustrated in FIG. 5, a reel assembly 48 may be disposed in the housing interior 8 of the device housing 2. As illustrated in FIGS. 1 and 2, a reel crank 54 may drivingly engage the reel assembly 48 for rotation. The chalk marking assembly 24 may be wound on the reel assembly 48 for selective deployment of the chalk marking assembly 24 between the retracted and extended positions with respect to the device housing 2 via rotation of the reel assembly 48 by actuation of the reel crank 54. The chalk marking assembly 24 may have any design which is suitable for the purpose. Accordingly, as further illustrated in FIG. 5, in some embodiments, a reel axle 50 may be disposed in the housing interior 8 of the device housing 2. The reel axle 50 may span the side housing portions 5 of the device housing 2. A reel 49 may be journalled for rotation with or with respect to the reel axle 50. The proximal ends (not illustrated) of the main marking member 25 and the guide member 30 may be attached to the reel 49 and wound thereon. Accordingly, by rotation of the reel 49 in a first direction, typically by manual manipulation of the reel crank 54, the chalk marking assembly 24 may be wound in a first direction and retracted into the housing interior 8 through the chalk marking assembly slot 16, as illustrated in FIG. 4. By rotation of the reel 49 in the opposite, second direction, the chalk marking assembly 24 may be wound in the second direction and extended from the housing interior 8 through the chalk marking assembly slot 16, as illustrated in FIG. 3. In some embodiments, the reel 49 of the reel assembly 48 may be spring-loaded by a reel spring 51. The reel spring 51 may be configured to normally bias the reel 49 in the winding direction and maintain the chalk marking assembly 24 in the retracted position (FIG. 4) in the housing interior 8. The chalk marking assembly 24 may be grasped and pulled or extended from the housing interior 8 against the bias imparted by the reel spring 51. A reel catch 52 may be configured to engage the reel 49 to maintain the chalk marking assembly 24 in the selected extended position with respect to the device housing 2. The reel catch 52 may be released typically by pulling on the chalk marking assembly 24, by actuating a release lever (not illustrated) on the exterior of the device housing 2 and/or by initiating rotation of the reel crank 54 in the winding direction, typically according to the knowledge of those skilled in the art.

As illustrated in FIGS. 9-11, in typical application, the device 1 may facilitate placement of the chalk lines 59 (FIG. 10) on the bottom plate 62. The chalk lines 59 may serve as a location guide for placement of the wall studs 70 on the bottom plate 62 in the construction of an interior or exterior wall in the building 60. Accordingly, the bottom plate 62 may extend along the surface of the foundation 61 from a vertical end stud 63 at one end of the wall.

A supply of the powdered chalk material 58 may initially be placed into the housing interior 8 of the device housing 2 typically by deploying the chalk opening door 11 of the chalk opening 10 from the closed door position illustrated in FIG. 7 to the open door position illustrated in FIG. 8, after which the chalk opening door 11 may be closed. The chalk marking assembly 24 may next be deployed from the retracted position in the housing interior 8 of the device housing 2, as illustrated in FIG. 4, to a selected extended position from the device housing 2, as illustrated in FIG. 3. The length of the chalk marking assembly 24 which is extended from the device housing 2 may depend on the length of the marking area along the bottom plate 62 on which the chalk lines 59 will be placed. Accordingly, as illustrated in FIG. 9, in some applications, an anchor structure 65 may be erected, installed or placed on the bottom plate 62 at the end of the marking area on the bottom plate 62 which is opposite the end stud 63 and the engaging member 40 on the chalk marking assembly 24 engaged with the anchor structure 65. The device housing 2 may then be pulled horizontally away from the anchor structure 65 and toward the end stud 63 such that the chalk marking assembly 25 unwinds from the reel 49 (FIG. 5) of the reel assembly 48 and extends horizontally over and above the bottom plate 62 and from the housing interior 3 through the chalk marking assembly slot 16 typically until the device housing 2 is positioned adjacent to the end stud 63, as illustrated in FIG. 9. The anchor structure 65 may be any type of structure or object which is available on the construction site and with which the engaging member 40 can remain securely engaged as the chalk marking assembly 25 is extended from the device housing 2. For example and without limitation, in various applications, the anchor structure 65 may include a stud, box, toolbox or block of wood, for example and without limitation.

In its retracted position in the housing interior 8, the chalk marking assembly 24 is submerged in the powdered chalk material 58. As the chalk marking assembly 24 is subsequently extended from the housing interior 8, a substantial quantity of the powdered chalk material 58 may remain coated on the main marking member 25, the guide member 30 and the center marking members 34 of the chalk marking assembly 24. Accordingly, as illustrated in FIG. 9, the extended chalk marking assembly 24 may be manually or digitally plucked or pulled upwardly and then released such that the main marking member 25 and the guide member 30 recoil downwardly and discharge powdered chalk material 58 from the main marking member 25, the guide member 30 and the center marking members 34 and onto the bottom plate 62. As illustrated in FIG. 10, the chalk lines 59 thusly formed on the bottom plate 62 may correspond to the pattern of the main marking member 25, the guide member 30 and each center marking member 34. The chalk lines 59 may therefore serve as a guide to subsequent placement of the wall studs 70 on the bottom plate 62, as illustrated in FIG. 11, with the lower end of each wall stud 70 typically placed within the rectangular confines of the chalk lines 59 formed by the main marking member 25, the guide member 30 and each pair of closely adjacent center marking members 34. The wall studs 70 may thus be placed and secured to the bottom plate 62 at the wall stud spacings 71 which correspond to the chalk line spacings 68. In some applications, the wall stud spacings 71 may be 16 center spacings whereas in other applications, the wall stud spacings 71 may be 24 inch or some other spacing.

The same procedure may be carried out to facilitate placement of the wall studs 70 along the entire length of the bottom plate 62 in framing of the wall. After each formation of the chalk lines 59, and prior to subsequent use, the chalk marking assembly 24 may be deployed from the extended position back to the retracted position in the housing interior 8 of the device housing 2 to again coat the chalk marking assembly 24 with the powdered chalk material 58. This may be accomplished by manual rotation of the reel crank 54 and/or by the biasing action of the reel spring 51 (FIG. 5).

Figure 14:
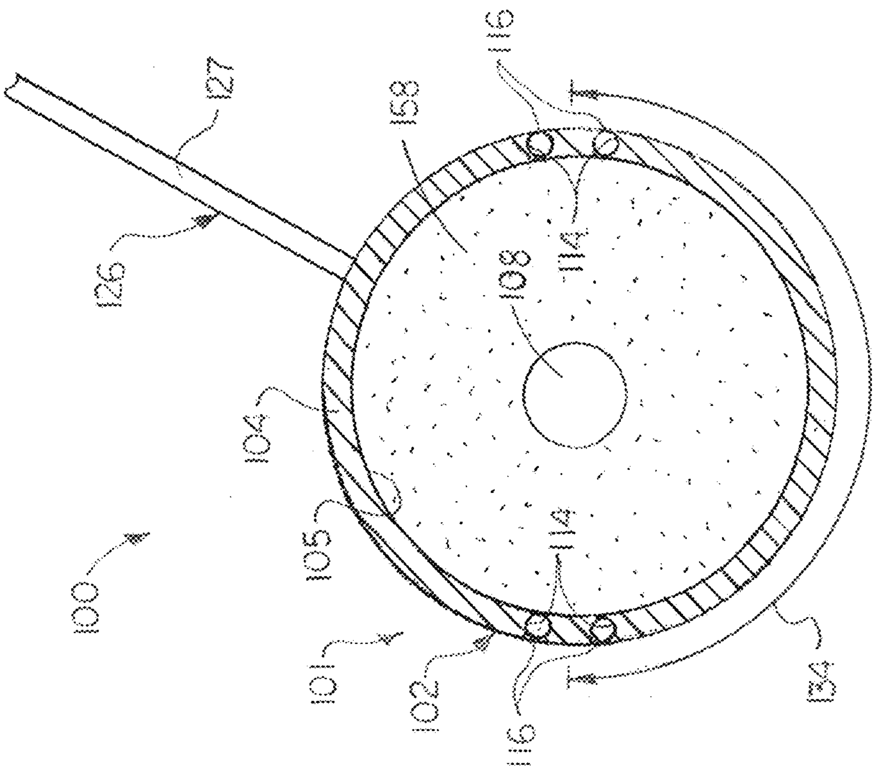
FIG. 14 is a sectional view, taken along section lines 14-14 in FIG. 13, of the chalk wheel of the illustrative chalk line marking device.

Referring next to FIGS. 12-24 of the drawings, an illustrative chalk wheel embodiment of the chalk line marking devices, hereinafter device, is generally indicated by reference number 100. As illustrated in FIGS. 12-18, the device 100 may include a chalk wheel handle 126. A chalk wheel 101 may be supported by and journaled for rotation with respect to the chalk wheel handle 126. The chalk wheel 101 may include a wheel housing 102. The wheel housing 102 may include a circumferential outer wheel housing portion 104. As illustrated in FIG. 14, multiple chalk dispensing cavities 114 may be provided in the outer wheel housing portion 104. Each chalk dispensing cavity 114 may be sized and configured to contain a supply of a powdered chalk material 158 and dispense the powdered chalk material 158 from the wheel housing 102 at the outer wheel housing portion 104 responsive to rolling of the chalk wheel 101 on the bottom plate 162 (FIG. 23) or other surface to form the chalk lines 159 on the bottom plate 162. As illustrated in FIG. 14, the chalk dispensing cavities 114 may be disposed at mark spacings 134 with respect to each other along the outer wheel housing portion 104. The mark spacings 134 may correspond in length to the chalk line spacings 168 or chalk line spacing 168 pairs (FIG. 23) which may be formed on the bottom plate 162 in construction of the wall in the building 160 in application of the device 100, as will be hereinafter described.

As further illustrated in FIG. 14, in some embodiments, the chalk dispensing cavities 114 may include multiple pairs of spaced-apart, adjacent chalk dispensing cavities 114. The distance between the chalk dispensing cavities 114 of each chalk dispensing cavity 114 pair may correspond to the thickness of each wall stud 170 (FIG. 24) which will be erected on the bottom plate 162 in construction of the wall of the building 160, typically as will be hereinafter further described.

In various embodiments, the mark spacings 134 between the adjacent chalk dispensing cavities 114 or between the adjacent pairs of the chalk dispensing cavities 114 may have any of various lengths or spacings typically depending on the application of the device 100. For example and without limitation, in some embodiments, the mark spacings 134 may include 16-inch mark spacings, with the wheel housing 102 having a circumference of 32". In other embodiments, the mark spacings 134 may include 24-inch mark spacings, with the wheel housing 102 having a circumference of 48". In construction of the wall of the building 160 (FIG. 24), the 16-inch mark spacings 134 may facilitate placement of the wall studs 170 at 16-inch center wall stud spacings 171, whereas the 24-inch mark spacings 134 may facilitate placement of the wall studs 170 at 24-inch center wall stud spacings 171.

Figure 12:
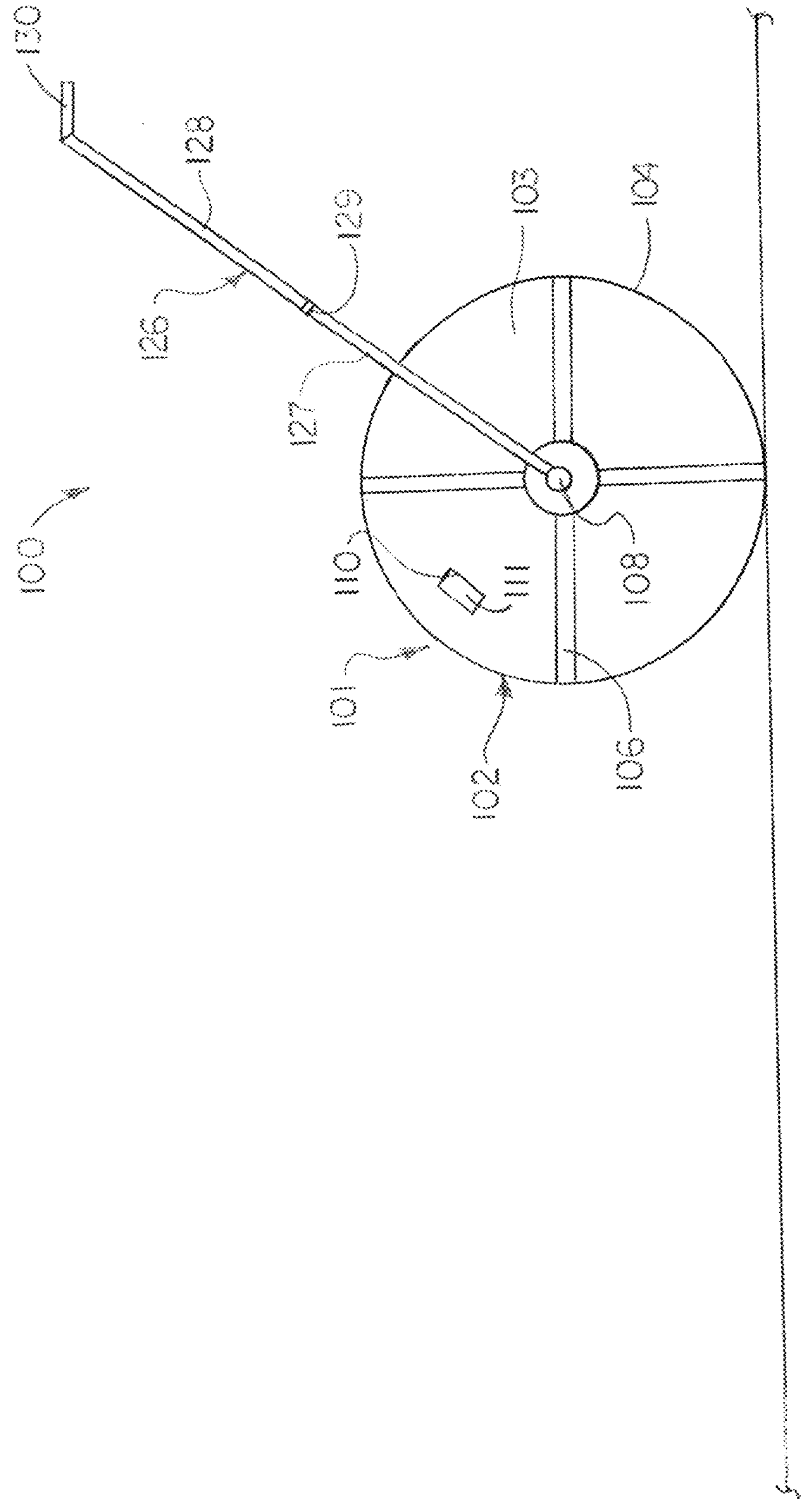
FIG. 12 is a side view of an illustrative chalk wheel embodiment of the chalk line marking devices.
Figure 13:
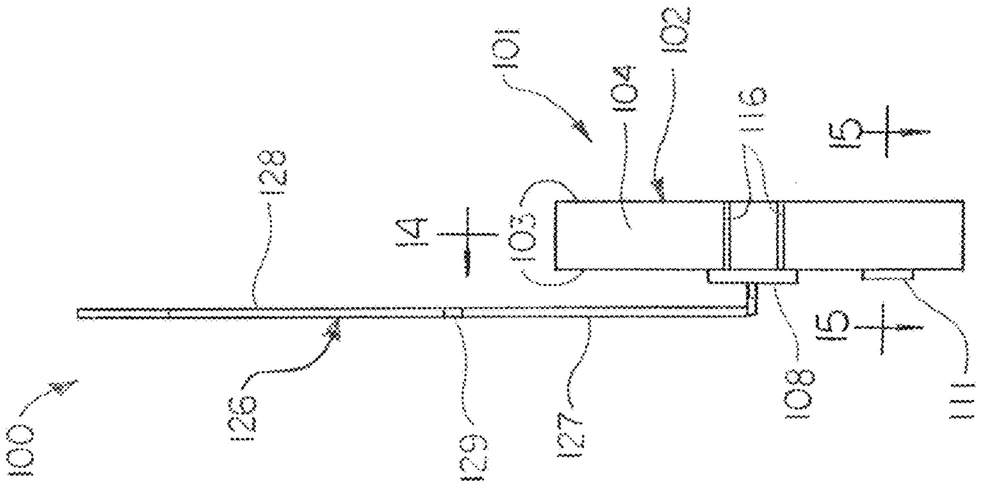
FIG. 13 is a front view of the illustrative chalk line marking device illustrated in FIG. 12.
Figure 15:
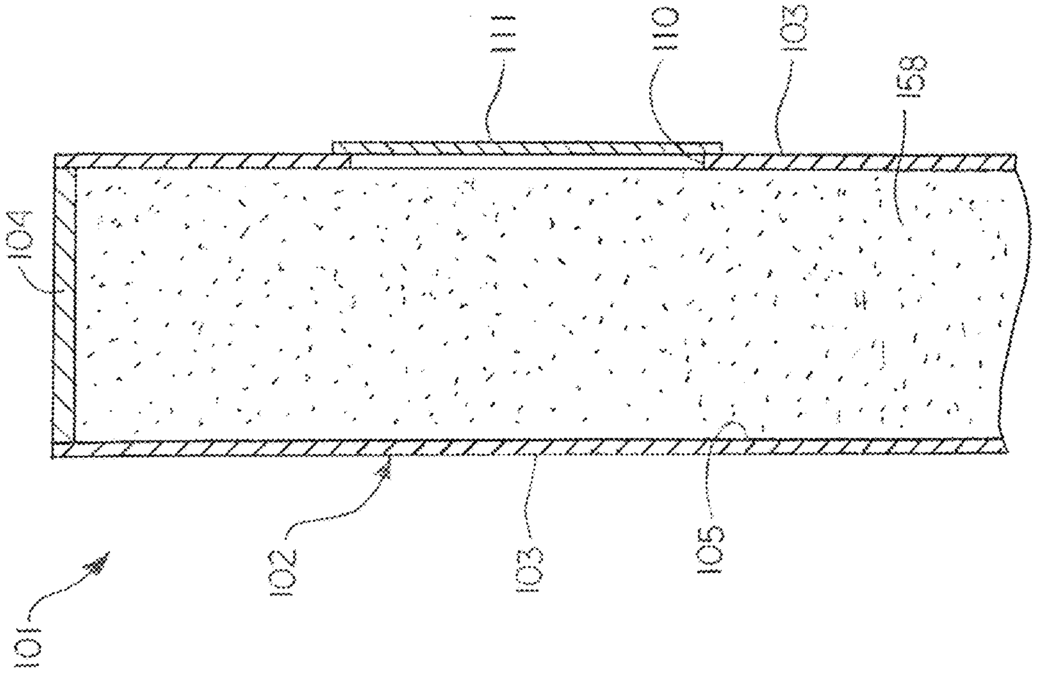
FIG. 15 is a sectional view, taken along section lines 15-15 in FIG. 13, of the chalk wheel.

As illustrated in FIGS. 12-14, the wheel housing 102 of the chalk wheel 101 may include a wheel axle 108. A pair of spaced-apart side wheel housing portions 103 may be rotatably mounted with respect to the wheel axle 108. The outer wheel housing portion 104 may extend between the side wheel housing portions 103. In some embodiments, the width of the chalk wheel 101 between the side wheel housing portions 103 may be about 2¾". As illustrated in FIGS. 14 and 15, a wheel housing interior 105 may be formed by and between the side wheel housing portions 103 and the outer wheel housing portion 104. As illustrated in FIG. 12, in some embodiments, a housing support frame 106 may be journalled for rotation with respect to the wheel axle 108 typically according to the knowledge of those skilled in the art. The side wheel housing portions 103 may be supported by the housing support frame 106.

As illustrated in FIGS. 12 and 15, in some embodiments, at least one chalk opening 110 may be provided in the wheel housing 102 in communication with the wheel housing interior 105. For example and without limitation, in some embodiments, the chalk opening 110 may be provided in at least one of the side wheel housing portions 103 of the wheel housing 102. At least one chalk opening door 111 may be selectively deployable in open and closed door positions with respect to the chalk opening 110. The chalk opening 110 may facilitate placement of the powdered chalk material 158 into the wheel housing interior 105.

Figure 16:
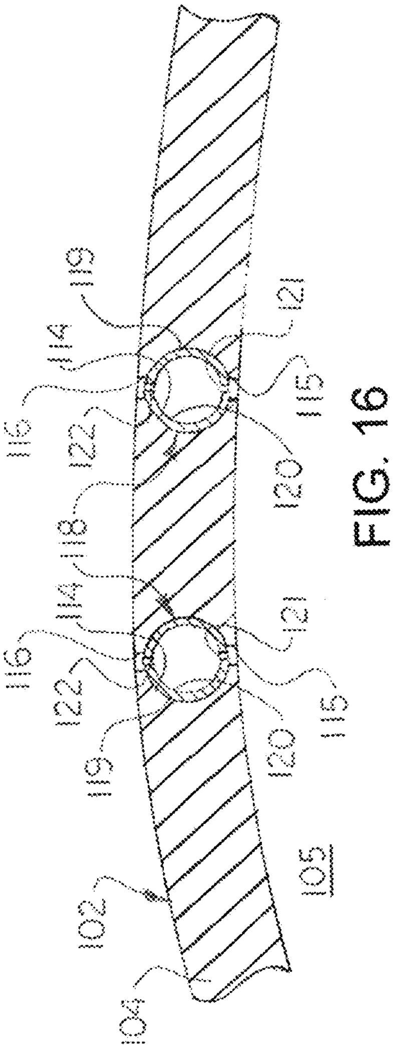
FIG. 16 is an enlarged sectional view of the outer wheel housing portion of the wheel housing of the chalk wheel, more particularly illustrating a pair of spaced-apart chalk dispensing cavities in the outer wheel housing portion and a chalk dispensing insert in each chalk dispensing cavity.
Figure 17:
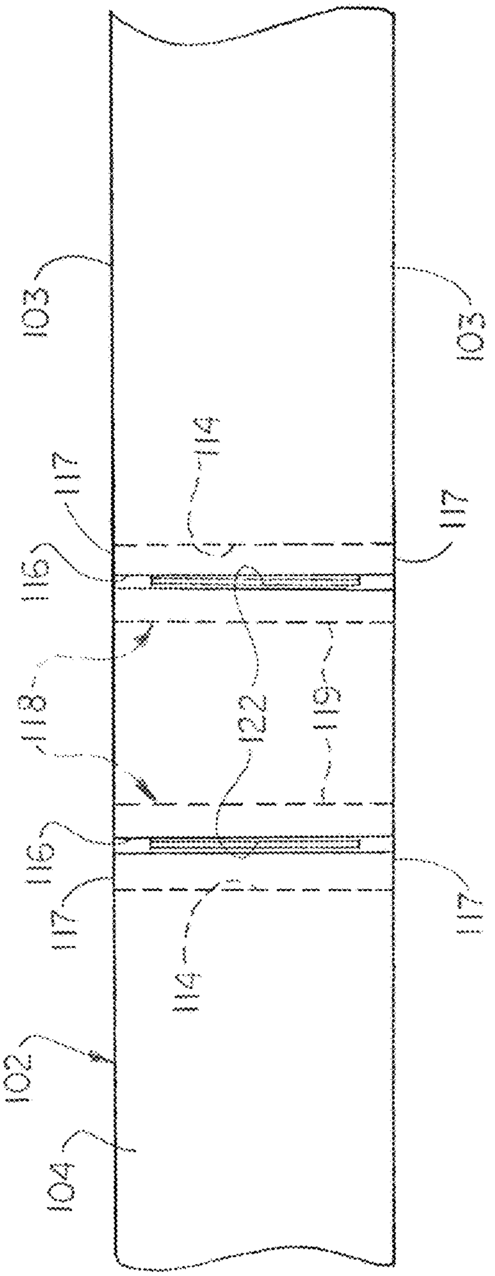
FIG. 17 is a top view of the chalk dispensing cavities with the chalk dispensing inserts (illustrated in phantom) deployed in place in the respective chalk dispensing cavities.
Figure 18:
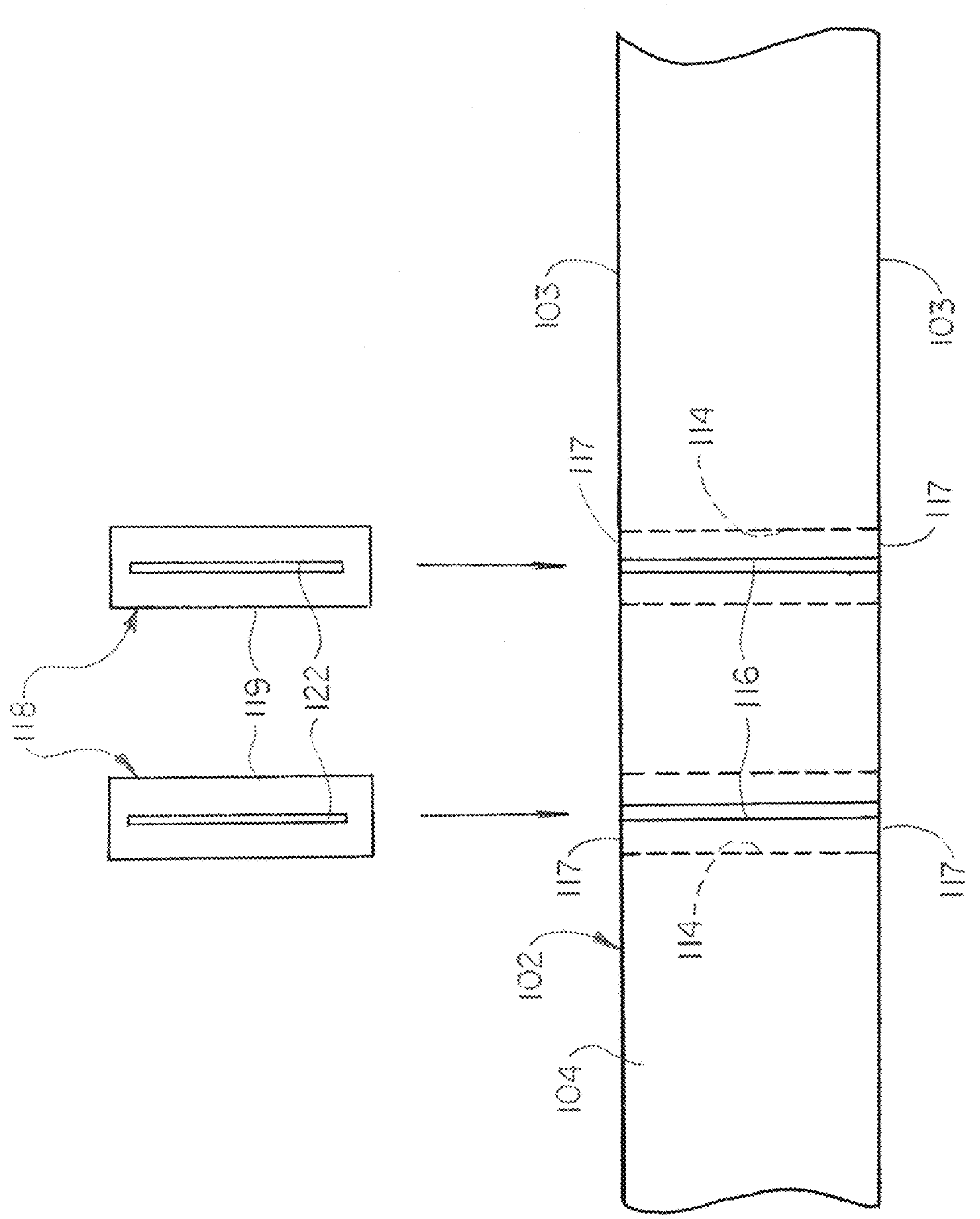
FIG. 18 is an exploded top view of the chalk dispensing cavities with the chalk dispensing inserts removed from the respective cavities.

As illustrated in FIG. 16, in some embodiments, an inner cavity slot 115 may establish communication between the wheel housing interior 105 of the wheel housing 102 and each chalk dispensing cavity 114. An outer cavity slot 116 may communicate with each chalk dispensing cavity 114. The outer cavity slot 116 may open to the outer surface of the outer housing portion 104 of the wheel housing 102. Accordingly, the inner cavity slot 115 and the outer cavity slot 116 may facilitate flow of the powdered chalk material 158 from the wheel housing interior 105 through the chalk dispensing cavity 114 to the exterior of the outer wheel housing portion 104. As illustrated in FIGS. 17 and 18, in some embodiments, each chalk dispensing cavity 114 may have cavity ends 117 which may open to the respective side wheel housing portions 103 of the wheel housing 102 typically for purposes which will be hereinafter described.

As further illustrated in FIGS. 16-18, in some embodiments, a chalk dispensing insert 118 may be deployed in each chalk dispensing cavity 114. Each chalk dispensing insert 118 may be sized and configured to contain the powdered chalk material 158 and dispense the powdered chalk material 158 from the wheel housing 102 at the outer wheel housing portion 104. As illustrated in FIG. 16, each chalk dispensing insert 118 may include a typically elongated, cylindrical insert wall 119 forming an insert interior 120. An inner insert slot 121 and an outer insert slot 122 may extend through the insert wall 119 in opposite or diametrically opposed relationship to each other. As further illustrated in FIG. 16, the inner insert slot 121 may align or register with the inner cavity slot 115, and the outer insert slot 122 may align or register with the outer cavity slot 116, of the chalk dispenser cavity 114. Accordingly, in typical application of the device 100, which will be hereinafter described, the powdered chalk material 158 may flow from the wheel housing interior 105 through the inner cavity slot 115, the inner insert slot 121, the insert interior 120, the outer insert slot 122 and the outer cavity slot 116, respectively, to the exterior of the outer wheel housing portion 104 to form the chalk lines 159 (FIG. 23) on the bottom plate 162 in construction of the wall of a building 160.

In some embodiments, the inner cavity slot 115 may be omitted from the outer wheel housing portion 104 of the wheel housing 102. The inner insert slot 121 may be omitted from the insert wall 119 of the chalk dispensing insert 118. The insert interior 120 of each chalk dispensing insert 118 may be pre-filled with the powdered chalk material 158, which may be dispensed from the insert interior 120 through the outer insert slot 122 and the outer cavity slot 116, respectively, at the surface of the outer wheel housing portion 104.

As illustrated in FIG. 18, in some embodiments, each chalk dispensing insert 118 may be releasably deployed in its corresponding chalk dispensing cavity 114. Accordingly, the chalk dispensing insert 118 may be inserted into and removed from the chalk dispensing cavity 114 through one of the open cavity ends 117 of the chalk dispensing cavity 114. Chalk dispensing inserts 118 which contain powdered chalk material 158 having different colors, sizes, textures and the like may be interchangeably deployed in the chalk dispensing cavities 114 to form chalk lines 159 having various colors for different marking purposes depending on the application.

The chalk wheel handle 126 of the device 100 may have any design which is suitable for the purpose of guiding the chalk wheel 101 as the chalk wheel 101 is rolled in a substantially straight line along the bottom plate 162. As illustrated in FIGS. 12 and 13, in some embodiments, the chalk wheel handle 126 may include a proximal handle segment 127. The proximal handle segment 127 may extend from the wheel axle 108 of the chalk wheel 101. A distal handle segment 128 may extend from the proximal handle segment 127. A handle grip 130 may extend from the distal handle segment 128. A handle hinge 129 may pivotally attach the distal handle segment 128 to the proximal handle segment 127. Accordingly, the chalk wheel handle 126 may be selectively deployable in an extended position, as shown, to facilitate application of the device 100. The chalk wheel handle 126 may be selectively deployable in a folded position (not illustrated) to facilitate space-efficient storage or transport of the device 100 by pivoting the distal handle segment 128 with respect to the proximal handle segment 127 at the handle hinge 129.

As illustrated in FIGS. 19-24, in typical application, the device 1 may facilitate placement of the chalk lines 159 on the bottom plate 162 to serve as a location guide for placement of the wall studs 170 (FIG. 24) on the bottom plate 162 in the construction of the wall in the building 160. A supply of the powdered chalk material 158 may initially be placed into the wheel housing interior 105 (FIG. 14) of the wheel housing 102 of the chalk wheel 101 typically by deploying the chalk opening door 111 of the chalk opening 110 from the closed door position to the open door position, pouring the powdered chalk material 158 through the chalk opening 110 and then closing the chalk opening door 111. Alternatively, the pre-filled chalk dispensing inserts 118 may be placed in the respective chalk dispensing cavities 114, typically as was heretofore described.

Figure 19:
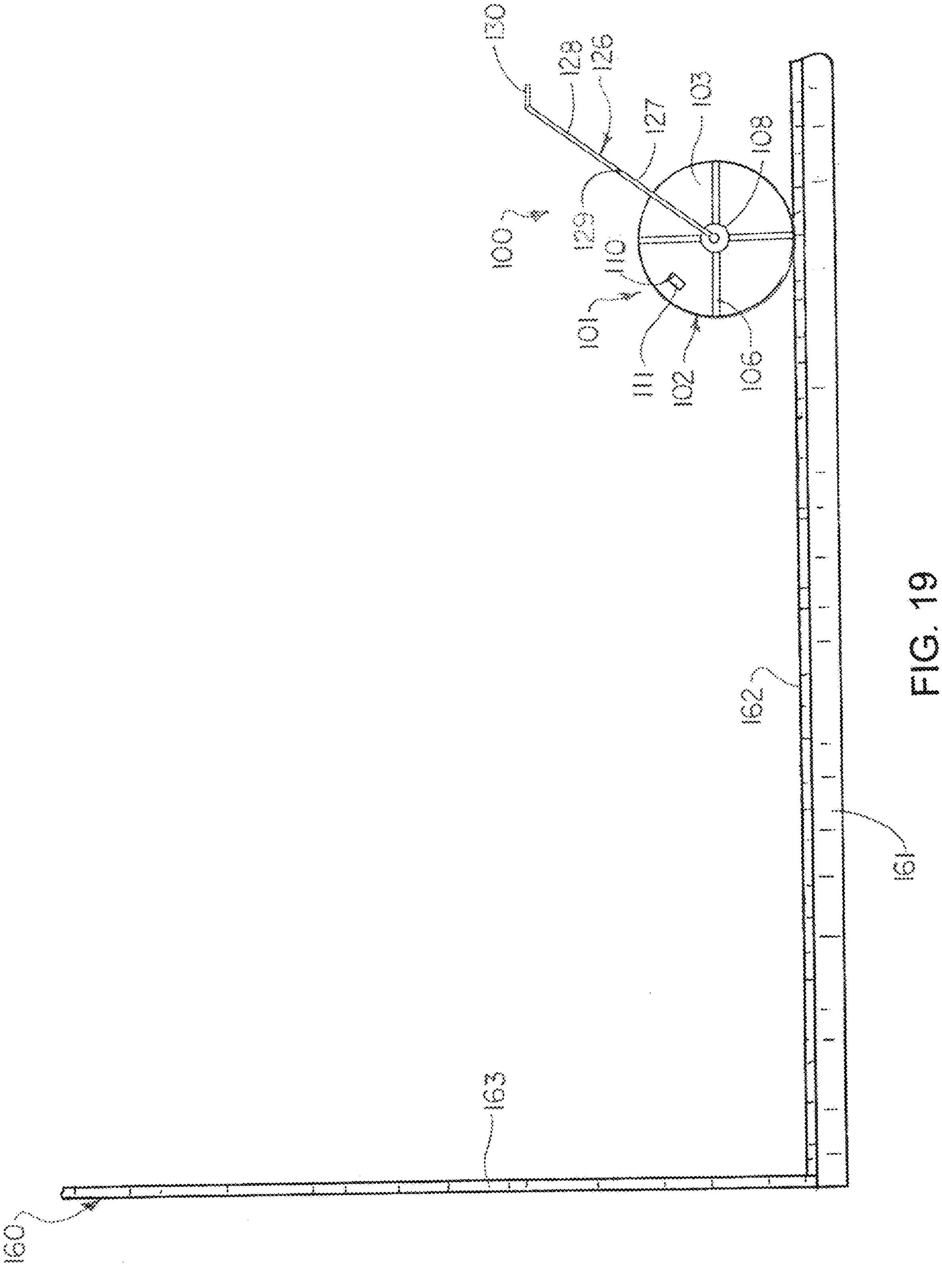
FIG. 19 is a side view, partially in section, of a wall section of a building having a foundation and a bottom plate on the foundation, more particularly illustrating typical placement of chalk lines on the bottom plate at selected chalk line spacings with respect to each other in typical application of the chalk wheel embodiment of the chalk line marking devices.
Figure 20:
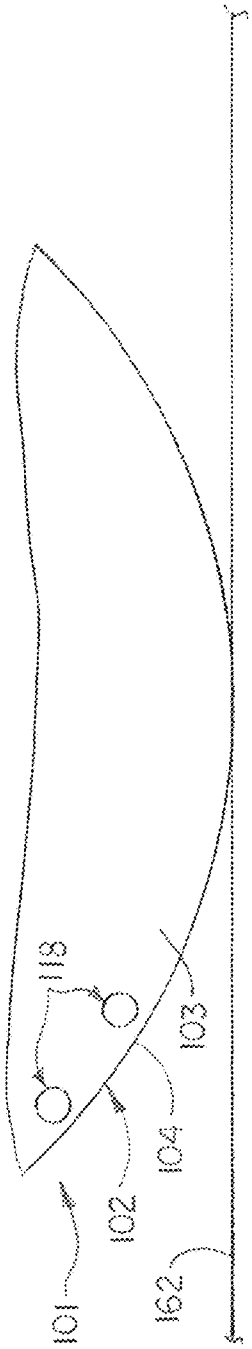
FIGS. 20-22 are sectioned sequential side views of the chalk wheel of the illustrative chalk line marking device, more particularly illustrating marking of the chalk lines on the bottom plate as the chalk wheel is rolled along the bottom plate.
Figure 21:
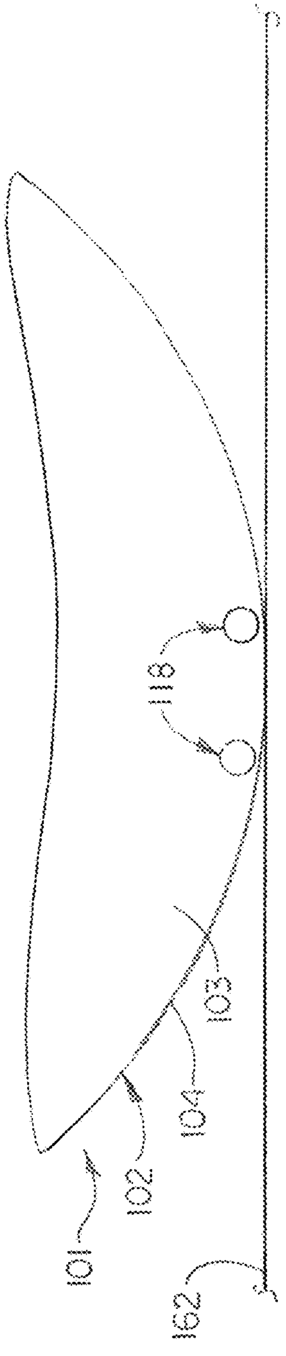
Figure 22:
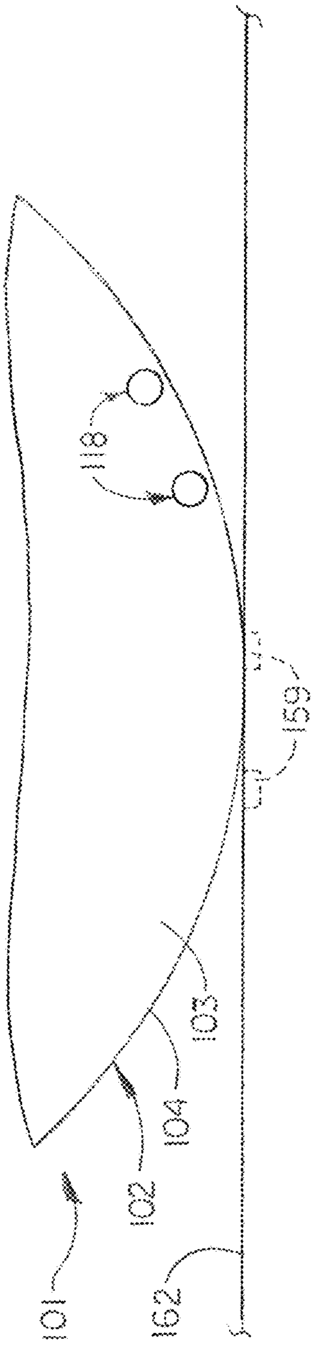
Figure 23:
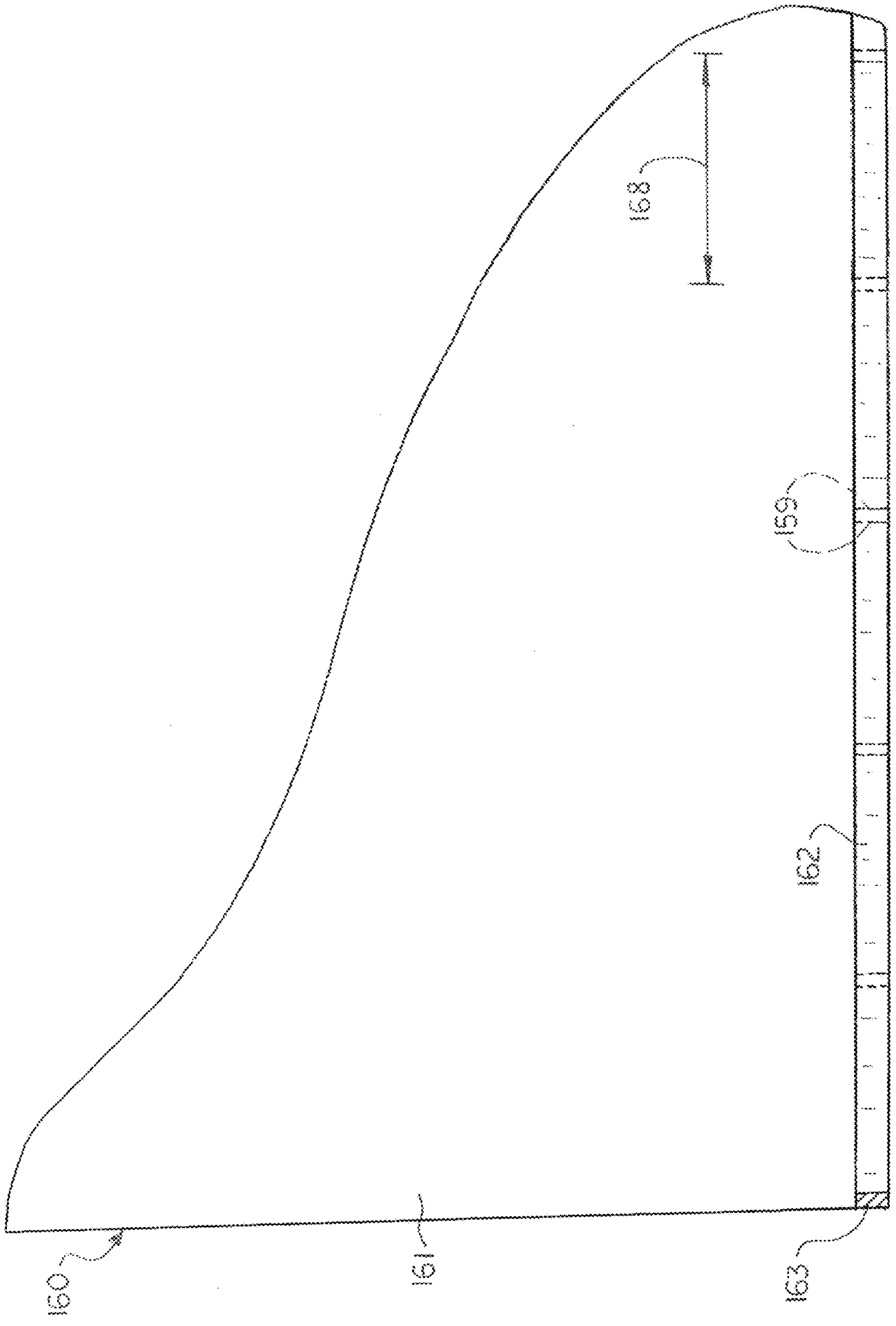
FIG. 23 is a top view, partially in section, of the foundation and the wall section on the foundation of the building with the chalk lines formed on the bottom plate at the selected chalk line spacings using the chalk wheel.
Figure 24:
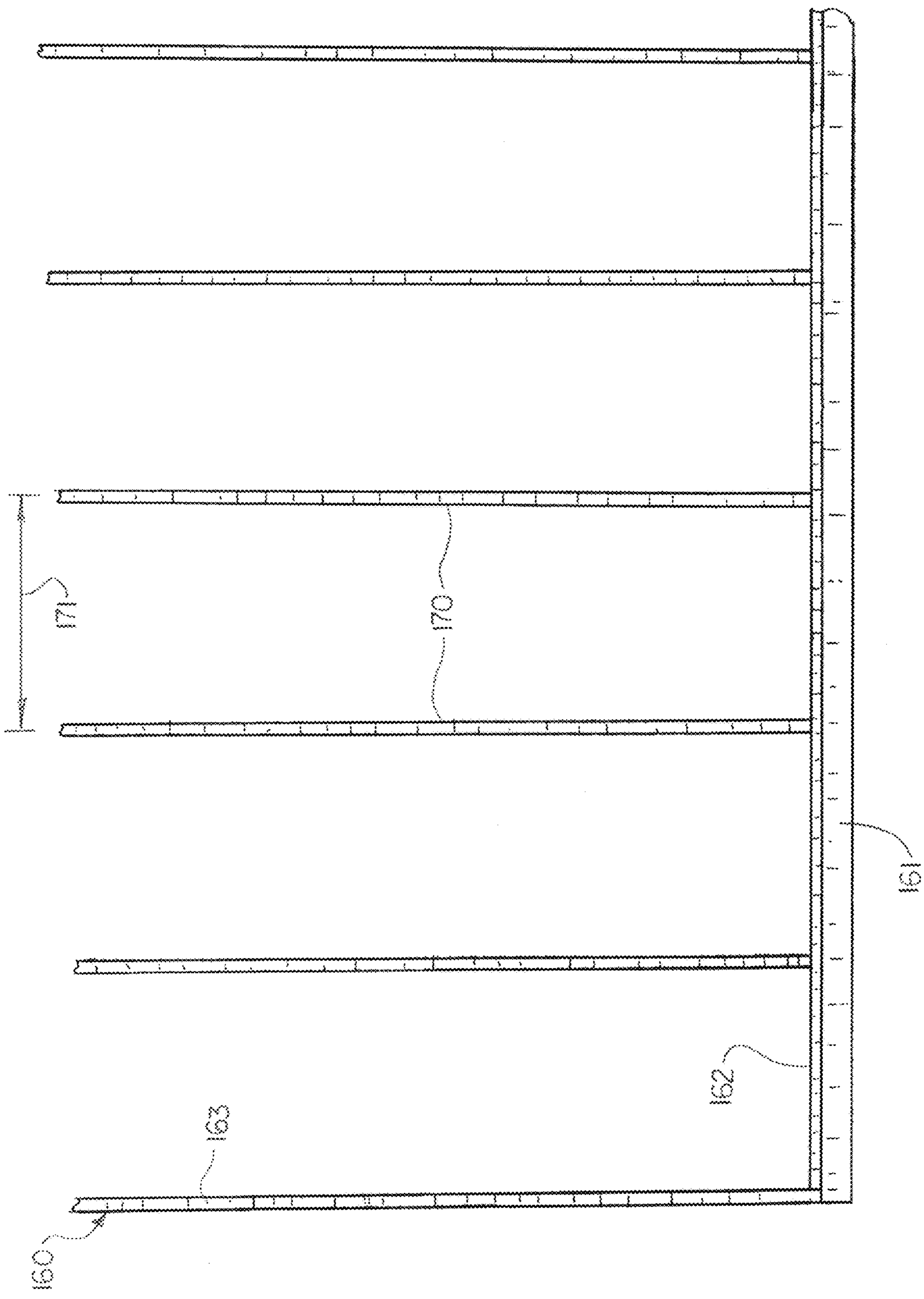
FIG. 24 is a side view, partially in section, of the wall section, with multiple wall studs extending upwardly from the bottom plate at the respective chalk lines and at wall stud spacings which correspond to the chalk line spacings of the chalk lines illustrated in FIG. 23.

As illustrated in FIG. 19, the chalk wheel 102 may be placed on the bottom plate 162 at the beginning of the marking area along the bottom plate 162 on which the chalk lines 159 will be placed, typically either away from and facing toward the end stud 163, as illustrated, or adjacent to and facing away from the end stud 163. The operator (not illustrated) of the device 100 may stand on the bottom plate 162 or on the foundation 161 next to the bottom plate 162 and grasp the handle grip 130 of the chalk wheel handle 126. As illustrated in FIGS. 20-22, the chalk wheel 101 may be rolled along the bottom plate 162 toward or away from the end stud 163 along the marking area such that the powdered chalk material 158 is discharged typically from the chalk dispensing inserts 118 through the respective outer insert slots 122 and registering outer cavity slots 116 (FIG. 16) onto the bottom plate 162 as the outer cavity slots 116 contact the surface of the bottom plate 162, as illustrated in FIG. 22, forming the chalk lines 159 on the bottom plate 162. The chalk lines 159 may therefore serve as a guide to subsequent placement of the wall studs 170 on the bottom plate 162, as illustrated in FIG. 24, with the lower end of each wall stud 170 typically placed between the chalk lines 159 formed by the paired adjacent chalk dispensing inserts 118. The wall studs 170 may thus be placed and secured to the bottom plate 162 at the wall stud spacings 171 which correspond to the chalk line spacings 168. In some applications, the mark spacings 134, and thus, the wall stud spacings 171, may be 16 center spacings whereas in other applications, the mark spacings 134 and the wall stud spacings 171 may be 24 inch or some other spacing.

The same procedure may be carried out to facilitate placement of the wall studs 170 along the entire length of the bottom plate 162 in framing of the wall. After each formation of the chalk lines 159, and prior to subsequent use, a replacement supply of the powdered chalk material 158 may be placed in the wheel housing interior 105 of the wheel housing 102 typically through the chalk opening 110. Alternatively, one or more of the typically pre-filled chalk dispensing inserts 118 may be replaced in one or more of the respective chalk dispensing cavities 114. The chalk wheel 101 may be rolled along the bottom plate 162 to again form the chalk lines 159 along a marking area on another segment of the bottom plate 162.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A chalk line marking device suitable for placing chalk lines at selected chalk line spacings on a surface, the device comprising:
- a device housing;
- a housing interior in the device housing, the housing interior sized and configured to contain a supply of a powdered chalk material;
- a chalk marking assembly slot in the device housing;
- a chalk marking assembly selectively extendable from the housing interior through the chalk marking assembly slot, the chalk marking assembly comprising:
  - an elongated, flexible main marking member;
  - an elongated, flexible guide member disposed in parallel, spaced-apart relationship to the main marking member; and
  - a plurality of center marking members spanning the main marking member and the guide member, the plurality of center marking members disposed at mark spacings with respect to each other, the mark spacings corresponding in length to the chalk line spacings, respectively.

2. The chalk line marking device of claim 1 further comprising a reel assembly disposed in the housing interior of the device housing and a reel crank engaging the reel assembly for rotation, and wherein the chalk marking assembly is wound on the reel assembly.

3. The chalk line marking device of claim 1 wherein each of the main marking member and the guide member of the chalk marking assembly is a segment of string, thread, twine, cord or a combination thereof.

4. The chalk line marking device of claim 1 wherein the mark spacings comprise 16 inch mark spacings.

5. The chalk line marking device of claim 1 wherein the mark spacings comprise 24 inch mark spacings.

6. The chalk line marking device of claim 1 further comprising at least one chalk opening in the device housing and at least one chalk opening door selectively deployable in open and closed door positions with respect to the at least one chalk opening.

7. The chalk line marking device of claim 1 further comprising at least one slot seal in the chalk marking assembly slot, and wherein the at least one slot seal sealingly engages the chalk marking assembly.

8. The chalk line marking device of claim 1 further comprising at least one engaging member on the main marking member and the guide member of the chalk marking assembly.

9. The chalk line marking device of claim 1 wherein the plurality of center marking members comprises a plurality of center marking member pairs, respectively.

10. A chalk line marking device suitable for placing chalk lines at selected chalk line spacings on a surface, the device comprising:
- a chalk wheel handle; and
- a chalk wheel carried by and journaled for rotation with respect to the chalk wheel handle, the chalk wheel comprising:
  - a wheel housing comprising a circumferential outer wheel housing portion; and
  - a plurality of chalk dispensing cavities in the outer wheel housing portion, each of the plurality of chalk dispensing cavities sized and configured to contain a supply of a powdered chalk material and dispense the powdered chalk material from the wheel housing at the outer wheel housing portion responsive to rolling of the chalk wheel on the surface, the plurality of chalk dispensing cavities disposed at mark spacings with respect to each other along the outer wheel housing portion, the mark spacings corresponding in length to the chalk line spacings, respectively.

11. The chalk line marking device of claim 10 further comprising a plurality of chalk dispensing inserts in the plurality of chalk dispensing cavities, respectively, the plurality of chalk dispensing inserts sized and configured to contain the powdered chalk material and dispense the powdered chalk material from the wheel housing at the outer wheel housing portion.

12. The chalk line marking device of claim 11 wherein the plurality of chalk dispensing inserts is releasably disposed in the plurality of chalk dispensing cavities, respectively.

13. The chalk line marking device of claim 10 further comprising a wheel housing interior in the wheel housing, the wheel housing interior sized and configured to contain the powdered chalk material and dispense the powdered chalk material to the plurality of chalk dispensing cavities, respectively.

14. The chalk line marking device of claim 13 further comprising at least one chalk opening in the wheel housing and communicating with the wheel housing interior and at least one chalk opening door selectively deployable in open and closed door positions with respect to the at least one chalk opening.

15. The chalk line marking device of claim 10 wherein the mark spacings comprise 16 inch mark spacings.

16. The chalk line marking device of claim 10 wherein the mark spacings comprise 24 inch mark spacings.

17. The chalk line marking device of claim 10 wherein the plurality of chalk dispensing cavities comprises a plurality of chalk dispensing cavity pairs, respectively.

18. A chalk line marking device suitable for placing chalk lines at selected chalk line spacings on a surface, the device comprising:
- a chalk wheel handle; and
- a chalk wheel carried by and journaled for rotation with respect to the chalk wheel handle, the chalk wheel comprising:
  - a wheel housing comprising a pair of spaced-apart side wheel housing portions, a circumferential outer wheel housing portion on the side wheel housing portions and a wheel housing interior formed by the side wheel housing portions and the outer wheel housing portion;
  - a plurality of chalk dispensing cavities in the outer wheel housing portion, the plurality of chalk dispensing cavities disposed at mark spacings with respect to each other, the mark spacings corresponding in length to the chalk line spacings, respectively;
  - a plurality of inner cavity slots establishing communication between the wheel housing interior and the plurality of chalk dispensing cavities, respectively;
  - a plurality of outer cavity slots communicating with the plurality of chalk dispensing cavities, respectively, and opening to the outer wheel housing portion; and
  - a plurality of chalk dispensing inserts in the plurality of chalk dispensing cavities, respectively, and communicating with the plurality of inner cavity slots and the plurality of outer cavity slots, respectively, the plurality of chalk dispensing inserts sized and configured to contain a supply of powdered chalk and dispense the powdered chalk from the wheel housing through the plurality of outer cavity slots, respectively, at the outer wheel housing portion.

19. The chalk line marking device of claim 18 wherein the mark spacings comprise 16 inch mark spacings.

20. The chalk line marking device of claim 18 wherein the mark spacings comprise 24 inch mark spacings.

* * * * *